UNITED STATES PATENT OFFICE.

FREDERICK W. COTTRELL, OF LONDON, COUNTY OF MIDDLESEX, ENGLAND.

MANUFACTURE OF MATERIAL TO FORM ARTIFICIAL IVORY.

SPECIFICATION forming part of Letters Patent No. 254,280, dated February 28, 1882.

Application filed December 22, 1881. (No specimens.) Patented in England August 4, 1881.

*To all whom it may concern:*

Be it known that I, FREDERICK WILLIAM COTTRELL, a subject of the Queen of Great Britain and Ireland, residing at 35 Calthorpe street, in the city of London and county of Middlesex, Kingdom of Great Britain and Ireland, have invented certain new and useful Improvements in the Manufacture of Material to Form Artificial Ivory, and applicable also as a substitute for horn, coral, malachite, vulcanite, india-rubber, gutta-percha, and for various other purposes, (for which I have obtained Provisional Protection in Great Britain, No. 3,376, dated August 4, 1881;) and I do hereby declare that the following is a full, clear, and exact description of the invention, which will enable others skilled in the art to which it appertains to make and use the same.

This invention relates to the production or manufacture of material to form artificial ivory, and applicable also as a substitute for horn, coral, malachite, vulcanite, india-rubber, gutta-percha, and for various other purposes.

In the production of collodion, gun-cotton, xyloidine, and celluloid it has hitherto been the custom to act upon fiber by a mixture of sulphuric and nitric acids, or by a mixture of sulphuric, nitric, and muriatic acids, or by a mixture of sulphuric, nitric, and nitrous acids. The product is soluble only in expensive liquids—such as sulphuric ether, nitro-benzole, camphorated solutions, or alcohol, in combination with hydrocarbons—and, further, it is objectionable from the dangerous condition in which it is left.

According to my invention I produce a substance more tough and elastic than that usually manufactured by the ordinary process and soluble in alcohol alone. For this purpose I take fiber, either in the state of raw or bleached cotton rags, esparto-grass, paper, or the like, and submit it to the action of an acid solution which I prepare as follows: I take sulphuric acid—say of a gravity of 1840 to 1850—and this I place in a receiver. I also take nitrous acid—say of a gravity of 1420, or thereabout—and place it in a retort in connection with the receiver, or in any other appliance suitable for evolving and conducting the fumes in such a manner that the whole of the sulphuric acid shall be well saturated by them. This may be effected by bringing the retort or other vessel containing the nitrous acid to elevated temperature, but not exceeding 132° Fahrenheit. If the temperature be too high, nitric acid will distill over.

I usually employ twenty-five parts of a saturated solution of nitrous acid in nitric acid to seventy-five parts of sulphuric acid; but I do not confine myself to these proportions, but vary them according to my requirements, in some cases employing twenty parts of nitrous acid to eighty parts of sulphuric acid, and in other cases thirty parts of nitrous acid to seventy parts of sulphuric acid; or I make the nitrous acid by any of the well-known methods—such as dissolving copper in nitric acid and adding to the evolved gas a sufficient supply of oxygen to convert it into nitrous acid. This gas can then be passed direct into the sulphuric acid.

By "nitrous acid" I mean peroxide of nitrogen, ($NO_4$,) which is usually sold dissolved in nitric acid, and is known commercially as "nitrous acid." This prepared acid can be used either in a cold state or at a temperature not exceeding 95° Fahrenheit.

The fiber to be acted upon is immersed in the acid, one gallon of the prepared acid to one pound of the fiber being convenient proportions. It is then immediately extracted slightly and allowed to stand from twenty minutes to one hour, by which time its conversion has taken place. It is afterward washed in a plentiful supply of water to free it as much as possible from the acids, after which it is immersed in a solution of borax or sulphide of barium, or thoroughly washed in an alkaline lye, and a strong solution of the following materials added: alum, soda-carbonate, and silicate of soda; and the proportions that I have found to be advantageous in working are six parts of the first, eight parts of the second, and twenty parts of the third; but I do not confine myself to these proportions, as the solution is effective if variously compounded. After being dried the material is fit to be treated by the solvent, either for the manufacture of solid articles or for solutions of any given substance or fluidity. The solvent I prepare for the solid or rigid articles is alcohol, either alone or combined with a hydrocarbon, and this I employ usually in the proportions of one pound of solvent to one pound of the converted fiber. Compounds to match any color may be prepared. In the case of pliable articles I use from twenty to fifty per cent. of an oil that will combine with the alcohol and remain in the material, thereby keeping it always pliable and soft.

What I claim is—

1. In the manufacture of a material to form artificial ivory and for other uses, as above specified, the process of rendering fiber soluble in alcohol, (with or without addition of hydrocarbon,) which consists in immersing such fiber in a saturated solution of nitrous acid in sulphuric acid, substantially as described.

2. In the manufacture of a material to form artificial ivory and for other uses, as above specified, the process of rendering fiber soluble in alcohol, (with or without hydrocarbon,) which consists in immersing such fiber in a saturated solution of nitrous acid in sulphuric acid for a very short period, such as above specified, and then slightly pressing the fiber and allowing it to stand for from twenty minutes to an hour to complete its conversion, substantially as described.

3. In the manufacture of a material to form artificial ivory and for other uses, as above specified, the process of treating fiber that has been rendered soluble in alcohol, (with or without addition of hydrocarbon,) which consists in washing such fiber with water and then treating it with a saline solution to neutralize any remaining acid and to render the treated fiber non-explosive, substantially as described.

4. In the manufacture of a material to form artificial ivory and for other uses, as above specified, the process of treating fiber that has been rendered soluble in alcohol, (with or without addition of hydrocarbon,) which consists in washing such fiber, then treating the same with saline solution to neutralize any remaining acid and to render it non-explosive, and afterward adding to such fiber strong solutions of alum, and of carbonate of soda and of silicate of soda, all substantially as described.

5. In the manufacture of a material to form artificial ivory and for other uses, as above specified, the process of treating fiber that has been rendered soluble in alcohol, (with or without addition of hydrocarbons,) which consists in washing such fiber, then treating the same with a saline solution, then adding strong solutions of alum, carbonate of soda, and of silicate of soda, and afterward drying the material and dissolving it in alcohol, either alone or combined with hydrocarbons, substantially as described.

FRED. W. COTTRELL.

Witnesses:
F. J. BROUGHAM,
J. G. STOKES,
*Clerks to Mr. W. Lloyd Wise, Patent Agent, London.*